United States Patent [19]

Dunn

[11] 4,161,918

[45] Jul. 24, 1979

[54] ROLLOVER AND WIPE PROJECTIVE CIRCUIT FOR AN ELECTRICAL SWITCHING ARRAY

[75] Inventor: William H. Dunn, Branchville, N.J.

[73] Assignee: The Singer Company, New York, N.Y.

[21] Appl. No.: 882,006

[22] Filed: Feb. 28, 1978

[51] Int. Cl.² .............................................. D05B 3/02
[52] U.S. Cl. .................................. 112/158 E; 307/115
[58] Field of Search .......... 112/158 E, 121.11, 121.12; 307/113, 115, 139; 200/5 E

[56] References Cited

U.S. PATENT DOCUMENTS

| | | | |
|---|---|---|---|
| 3,508,201 | 4/1970 | Morale | 307/115 X |
| 3,628,052 | 12/1971 | Mitchell | 307/115 |
| 3,872,808 | 3/1975 | Wurst | 112/158 E |

*Primary Examiner*—Peter Nerbun

*Attorney, Agent, or Firm*—Robert E. Smith; William V. Ebs; Edward L. Bell

[57] ABSTRACT

A control panel influenced by the touch of an operator is disclosed in which the density of individually selectable inputs may be increased by the provision of protective measures for preventing inadvertent or accidental actuation of inputs which are located closely adjacent to an input that is intended to be actuated. A protective circuit for an electrical switching array is disclosed effective to prevent selection from being made unless the switching is effected by the operator in a prescribed fashion to prevent unintended selection in the event that the operator's finger should roll onto an adjacent switch during the selection process. The protective circuit also prevents further selection once a selection has been effected until the operator's finger is completely withdrawn from the switching array in order to provide protection against a series of consecutive selections in the event that the operator were to wipe across the switching array.

5 Claims, 4 Drawing Figures

ROLLOVER AND WIPE PROJECTIVE CIRCUIT FOR AN ELECTRICAL SWITCHING ARRAY

BACKGROUND OF THE INVENTION

Where a plurality of individually selectable control elements are required it is possible so to physically isolate each such element as to minimize the possibility of inadvertent or accidental actuation. Isolation as a solution to this problem however, involves the disadvantages of added expense incident to the provision of guard surfaces, and limitation on the total possible number of selectable elements. Such limitation is particularly disadvantageous in the case of an appliance such as a sewing machine where the total possible space on the casing which may accommodate control elements is severely restricted.

SUMMARY OF THE INVENTION

This invention provides for the effective and practical utilization of a touch panel control for a sewing machine.

It is an object of this invention to provide in an array of individually actuable control elements a means rendered effective by the selective actuation of one control element for preventing the inadvertent actuation of another.

This object of the invention is attained for a control panel comprising an array of individually selectable control switches by the provision of a protective circuit in which a prescribed operator influence necessary to actuate any of the control switches is sensed, and after actuation of any one of the control switches by the prescribed operator influence, actuation of any other of the control switches is prevented while sensing of the operator influence continues.

DESCRIPTION OF THE DRAWINGS

In the accompanying drawings of a preferred embodiment of the invention.

DETAILED DESCRIPTION OF THE INVENTION

Figure 1:
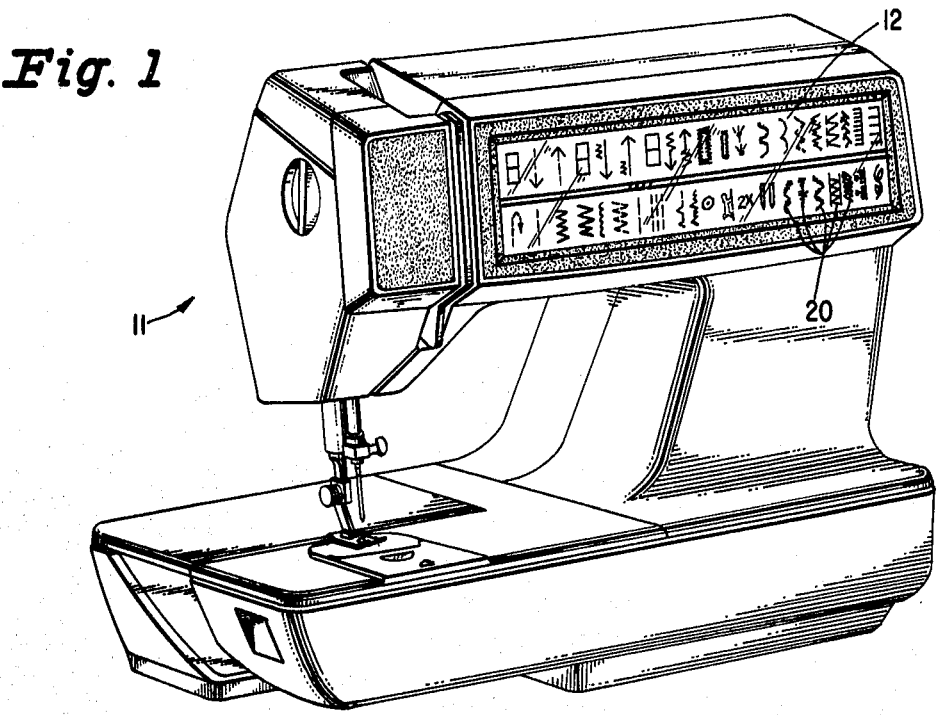
FIG. 1 is a perspective view of a sewing machine with a touch control panel of the type particularly well adapted for use with this invention.

Referring to the drawings, FIG. 1 illustrates a sewing machine indicated generally at 11 having a control panel 12 of the type for which the protective circuit of this invention is particularly adapted.

Reference is made to the U.S. Pat. No. 3,872,808, Mar. 25, 1975 to John W. Wurst of which the disclosure is incorporated herein by reference. U.S. Pat. No. 3,872,808 discloses a sewing machine in which stitch position coordinates may be controlled electronically and in which the means are provided for selecting any one of a number of different stitch patterns stored in the electronic memory. This invention has application to the electronic controls disclosed in the referenced U.S. Pat. No. 3,872,808.

The control panel 12 illustrated in FIG. 1 is of the type utilizing a continuous planar element such as a glass panel to which circuitry is applied as by deposition or the like to provide controls sensitive to the touch of an operator's finger. Indicated at 20 in FIG. 1 are representations of various stitch patterns available in the electronic memory and preferably the switching arrangement included on the panel is responsive to the operator's touch on selected areas denoted by the indicia 20. It will be appreciated that this invention also has application to control panels which include a plurality of push button operated switches or any other switching arrangement involving an array of touch sensitive areas 20 such as are illustrated on the control panel of FIG. 1.

Because of the magnitude of choice available by virtue of the electronic control of stitch patterns, and because of the limited area available on the surface of a sewing machine which can be devoted to the control panel 12, it is desirable to maximize the density of the switches included on the control panel.

As the switch density increases and particularly where touch controls are involved, the difficulty of effecting actuation of any one selected switch without inadvertent actuation of others increases. Two phenomenan, "rollover" and "wiping", may be identified as conditions conducive to accidental actuation of such switches. "Rollover" refers to a touch sufficently broad as to actuate adjacent switches simultaneously in quick succession. "Wiping" refers to the actuation of a series of such switches by a lateral movement of the operator's finger across the panel. It is an object of this invention to render the switches of a control panel insensitive to accidental or inadvertent actuation by either rollover or wiping.

Figure 4:
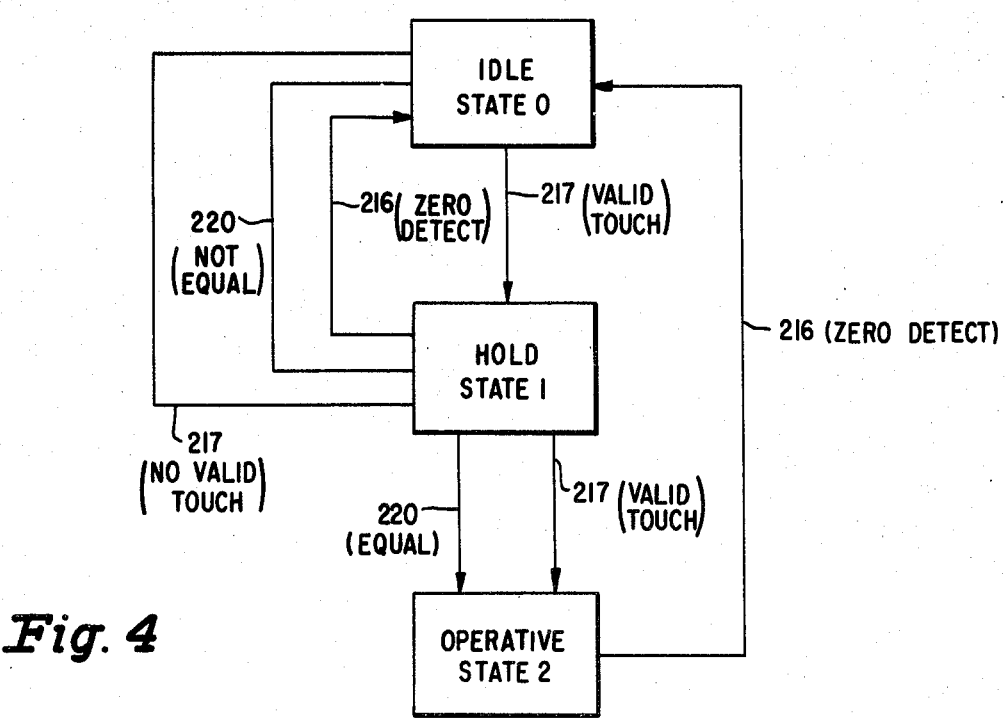
FIG. 4 is a state chart indicating the sequence of conditions which occur in the normal operation of the protective circuit of this invention.
Figure 2:
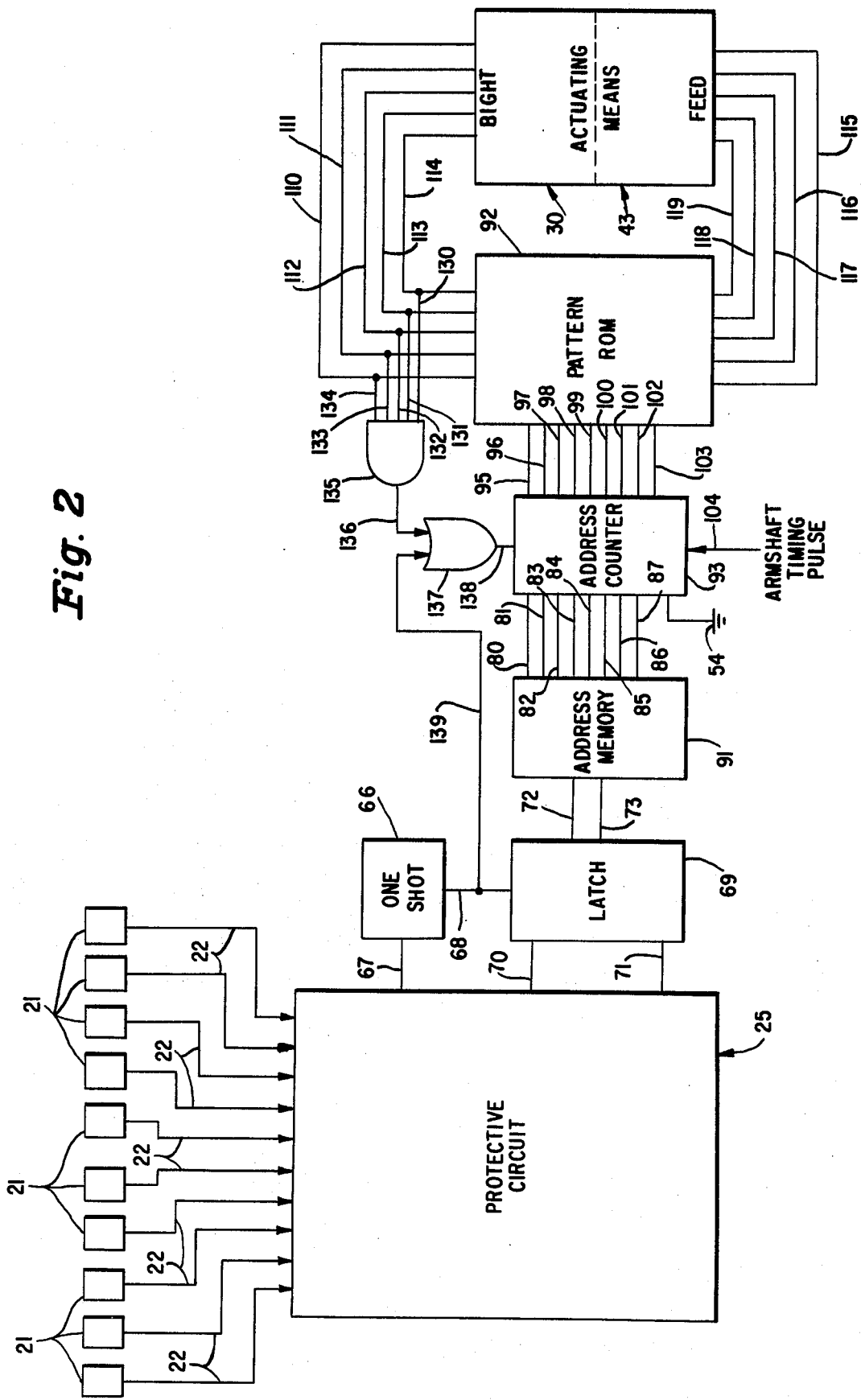
FIG. 2 is a functional block diagram of an electronic stitch pattern selector system for a sewing machine showing the protective circuit of the invention applied thereto.
Figure 3:
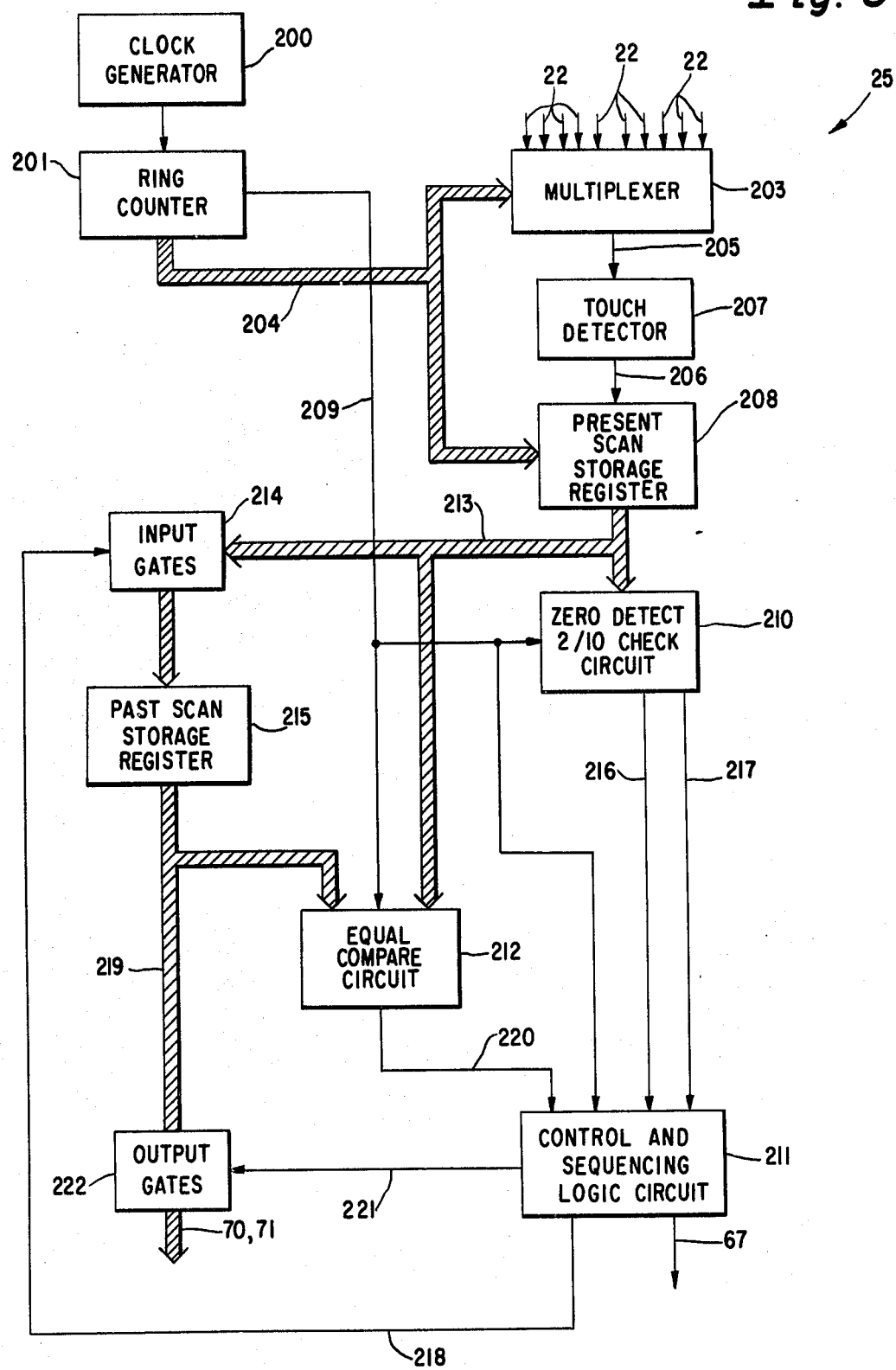
FIG. 3 is a functional block diagram of the protective circuit of this invention.

Implementation of this invention is illustrated diagrammatically in FIGS. 2, 3 and 4. As shown in FIG. 2, ten touch pads 21 are provided each with an input line 22 to the circuit 25. This number is chosen to satisfy the total of different control functions required and may be changed to suit the specific needs encountered. Each of the touch sensitive areas 20 on the sewing machine control panel 12 is associated with a specifically different two of the touch pads 21 so that a valid actuation of any one of the touch sensitive areas 20 will be reflected in signals on exactly two of the ten input lines 22.

As shown in FIG. 2 the input lines 22 are directed to a protective circuit indicated generally at 25 from which outputs on lines 67, 70 and 71 are possible to the memory and operating logic of an electronic control for a sewing machine. In FIG. 2, reference characters 30 through 139 are those described in detail in the U.S. Pat. No. 3,872,808 incorporated herein by reference.

The protective circuit 25 is illustrated diagrammatically in greater detail in FIG. 3. A clock generator 200 continuously steps a ring counter 201 and assuming ten touch sensitive inputs 22 to a multiplexer 203, a twelve position ring counter 201 would be appropriate.

By means of the connections 204, 205 and 206 the first ten positions of the ring counter 201 connect in turn each of the ten touch sensitive inputs 22 to a touch detector 207 and the output of the touch detector 207 to the corresponding bit in a present scan storage register 208.

A scan complete signal is generated by the ring counter 201 after each cycle of scanning which preferably occurs at approximately 720 microsecond intervals and the scan complete signal is applied on line 209 as an input to three circuits; a zero detect and 2 out of 10 check circuit 210; a control and sequencing logic circuit 211; and an equal compare circuit 212.

The output of the present scan storage register 208 is delivered by a connection 213 to the zero detect and 2 out of 10 check circuit 210, and also by way of input gates 214 to a past scan storage register 215. Upon receipt of the scan complete signal on the line 209, the zero detect and 2 out of 10 check circuit 210 will examine the contents of the present scan storage register 208, presented to it via the connection 213. If none of the touch sensitive areas are being touched, a signal will be generated by the zero detect circuit 210 on the line 216 to the control and sequencing logic circuit 211, maintaining this logic circuit in an idle state. If a valid scan occurs, i.e. exactly 2 out of 10 input lines 22 are active, then a signal will be generated by the 2 out of 10 check circuit 210 on line 217 to the control and sequencing logic circuit 211, which generates a signal in line 218 to the input gates 214, admitting the contents of the present scan storage register 208 into the past scan storage register 215.

The output of the past scan storage register 215 on lines 219 along with the line 213 from the present scan storage register 208 are directed to the equal compare circuit 212 and if two successive scans result in an equal valid input on lines 22 a signal will be delivered in line 220 from the equal compare circuit 212 to the control and sequencing logic circuit 211.

The control and sequencing logic circuit 211 preferably is arranged such that if three successive scans of the ring counter do not result in any zero detect, all result in a valid detection of 2 out of the 10 input lines 22, and each of these is equal to the first, the logic circuit will generate a signal on line 221, opening output gates 222 in the line 219 and will also generate a signal in the connection 67 from the logic circuit which corresponds to the line 67 shown in FIG. 2. From the output gates 222, the connections 70 and 71 correspond to the lines 70 and 71 shown in FIG. 2.

FIG. 4 illustrates a state chart which can explain the operation of the protective circuit of the invention by making clear that three states are possible for this circuit, an idle state, an interim or transient hold state, and an operative state in which one of a plurality of stitch patterns or control conditions is selected and maintained.

When none of the touch sensitive areas 20 on the control panel are being touched, which incidentally is the normal operating condition of the sewing machine, state 0 or idle condition obtains and selection of a different stitch pattern or control condition by touching any of the areas 20 is possible.

The process of selection requires that the circuit 25 must progress through the transient or hold state 1 and the only requirement for this is the reception on line 217 of a signal indicating a valid actuation of one and only one touch sensitive area, i.e. only 2 out of the 10 inputs 22 effective.

In order to progress from the transient state 1 to the operative state 2 the logic circuit 211 imposes a set of prescribed conditions, for instance, that a valid input be sensed on line 217 for three consecutive scans and that these three valid inputs must be equal as reflected in appropriate signals in line 220. It will be appreciated that any other code might be established as well.

To revert to the idle state 0 from the transient hold state 1 any one of three conditions will suffice i.e. either a zero detect on line 216, discontinuance of the valid signal indication on line 217 as by the sensing of more than two inputs on lines 22, or absence of an equal signal on line 220 indicating that the selection has changed before the completion of three successive scans. This prevents "rollover".

The reversion to the idle state 0 from the operative state 2 after a selection has been made can be effected only by the operator removing her finger from the control panel causing a zero detect on line 216. This affords "wipe" protection since movement of the operator's finger across a series of touch sensitive areas cannot effect a series of selections.

Having thus set forth the nature of the invention, what is claimed herein is:

1. In an appliance control panel having a plurality of individually actuatable control elements, selection means responsive only to the continuous touching, by the operator, on only a selected area of said control panel for a minimum of time for rendering any selected one of said control elements effective, said individually actuatable control elements comprising electric switch means with a specifically different predetermined combination of said switch means operatively associated with each one of said selected areas of said control panel, means for sequentially interrogating each of said switch means for sensing, identifying, and signalling said continuous touching by the operator, and means operative after any selected one of said control elements is rendered effective by said selection means for inhibiting and rendering ineffective subsequent continuous operator touching of said control panel and being responsive to a termination in said continuity of operator touching signaled by said sensing means for reestablishing the effectiveness of said operator touching to render effective a selected another one of said control elements.

2. In an appliance control panel having a plurality of individually actuatable control elements comprising electric switch means, selection means responsive only to the physical touch of said control panel by an appliance operator, and the continuity of operator touching on only a selected area of said control panel for a minimum duration of time for rendering any selected one of said control elements effective, means for sensing and signaling the existence and continuity of said operator touching on said control panel, and means operative after any selected one of said control elements is rendered effective by said selection means for inhibiting and rendering ineffective subsequent continuous operator touching of said control panel and being responsive to a termination in said continuity of said operator touching signaled by said sensing means for reestablishing the effectiveness of said operator touching to render effective a selected another one of said control elements, in which the means for establishing said minimum duration of time of operator touching comprises a detector circuit and a continuously operating scanning means sequentially connecting each of said electric switch means to said detector circuit at a predetermined frequency, and means associated with said detector circuit responsive to detection of actuation of only a prescribed number of said electric switch means for a predetermined consecutive number of full cycles of said scanning means for rendering said switch means effective.

3. In an appliance control panel as set forth in claim 2 in which the means responsive to a termination in said continuity of operator influence comprises means associated with said detector circuit responsive to a full cycle of said scanning means without detection of actuation of any one of said switch means.

4. In a sewing machine having a plurality of individually selectable operator influenced functions comprising: a touch panel associated with said sewing machine having individual areas thereon sensitive to an operator's touch for individually selecting said sewing machine functions, a plurality of touch pads arranged on said touch panel with a specifically different predetermined combination thereof operatively associated with each one of said touch sensitive areas, an input line from each of said touch pads directed to a protective circuit, means in said protective circuit to scan input signals from said touch pads for establishing and detecting prescribed conditions of operator influence of any of said predetermined combination of said touch pads, means for storing the values of said input signals for a predetermined number of scans and means for comparing these stored values to establish their identicality for rendering any selected one of said operator influenced functions effective, zero input detecting means in said protective circuit responsive to a predetermined set of values of said input signals for generating a signal indicating the absence of operator influence on all of said plurality of inputs, and means in said protective circuit operative upon effectiveness of any operator influenced function by establishment of said prescribed conditions for preventing selection of another operator influenced function until a signal is received from said zero input detecting means.

5. In a sewing machine having a plurality of individually selectable operator influenced functions, a touch panel associated with said sewing machine having individual areas thereon sensitive to an operator's touch for individually selecting said sewing machine functions, a plurality of touch pads arranged on said touch panel with a specifically different predetermined number thereof operatively associated with each one of said touch sensitive areas, an input line from each of said touch pads directed to a protective circuit, means in said protective circuit for establishing and detecting prescribed conditions of operator influence of any of said predetermined number of said touch pads for rendering any selected one of said operator influenced functions effective, zero input detecting means in said protective circuit for generating a signal responsive to the absence of operator influence on all of said plurality of inputs, and means in said protective circuit operative upon effectiveness of any operator influenced function by establishment of said prescribed conditions for preventing selection of another operator influenced function until a signal is received from said zero input detecting means, said protective circuit includes a clock pulse generator arranged to drive a ring counter and said means for establishing prescribed conditions of operator influence for rendering any selected one of said operator influenced functions effective comprises

- means driven by said ring counter for repeatedly scanning inputs detected on the input lines from said touch pads,
- means for comparing the inputs detected on each successive scan of said input lines,
- and means for rendering any selected one of said operator influenced functions effective only when inputs on the identical predetermined number of input lines have been detected for a predetermined number of successive scans.

* * * * *